United States Patent [19]

Breitler et al.

[11] Patent Number: 5,589,275
[45] Date of Patent: Dec. 31, 1996

[54] COMPOSITE MATERIAL

[75] Inventors: Hans P. Breitler, Kreuzlingen, Switzerland; Klaus Sommerer, Allensbach, Germany; Monique Roulin, Aesch, Switzerland

[73] Assignee: Alusuisse-Lonza Services AG, Switzerland

[21] Appl. No.: 318,643
[22] PCT Filed: Feb. 17, 1994
[86] PCT No.: PCT/CH94/00035
 § 371 Date: Oct. 5, 1994
 § 102(e) Date: Oct. 5, 1994
[87] PCT Pub. No.: WO94/19184
 PCT Pub. Date: Sep. 1, 1994

[30] Foreign Application Priority Data

Feb. 25, 1993 [CH] Switzerland .................. 576/93

[51] Int. Cl.⁶ ................................................ B32B 15/08
[52] U.S. Cl. .................. 428/458; 428/474.4; 206/531; 206/532
[58] Field of Search .................. 428/458, 474.4; 206/531, 532

[56] References Cited

U.S. PATENT DOCUMENTS

| 4,753,842 | 6/1988 | Okumura et al. | 428/474.4 |
| 4,759,972 | 7/1988 | Yoshiga et al. | 428/458 |
| 4,983,431 | 1/1991 | Gibbons et al. | 428/34.2 |
| 5,100,708 | 3/1992 | Heyes et al. | 428/458 |
| 5,126,211 | 6/1992 | Mizutani et al. | 428/474.4 |
| 5,139,878 | 8/1992 | Kim et al. | 428/421 |

FOREIGN PATENT DOCUMENTS

| 0002692 | 7/1979 | European Pat. Off. . |
| 0031701 | 7/1981 | European Pat. Off. . |
| 0234515 | 9/1987 | European Pat. Off. . |
| 0312308 | 4/1989 | European Pat. Off. . |
| 0414636 | 2/1991 | European Pat. Off. . |
| 1385529 | 2/1975 | United Kingdom . |
| 1495659 | 12/1977 | United Kingdom . |

*Primary Examiner*—Mark D. Sweet
*Attorney, Agent, or Firm*—Bachman & LaPointe, P.C.

[57] ABSTRACT

The composite material contains a metal layer on both sides of which is a plastic layer: the metal layer has a thickness of 8 to 80 μm, the plastic layers each a thickness of 20 to 50 μm; the plastic layers contain or comprise polyamide-based thermoplastics.

9 Claims, 1 Drawing Sheet

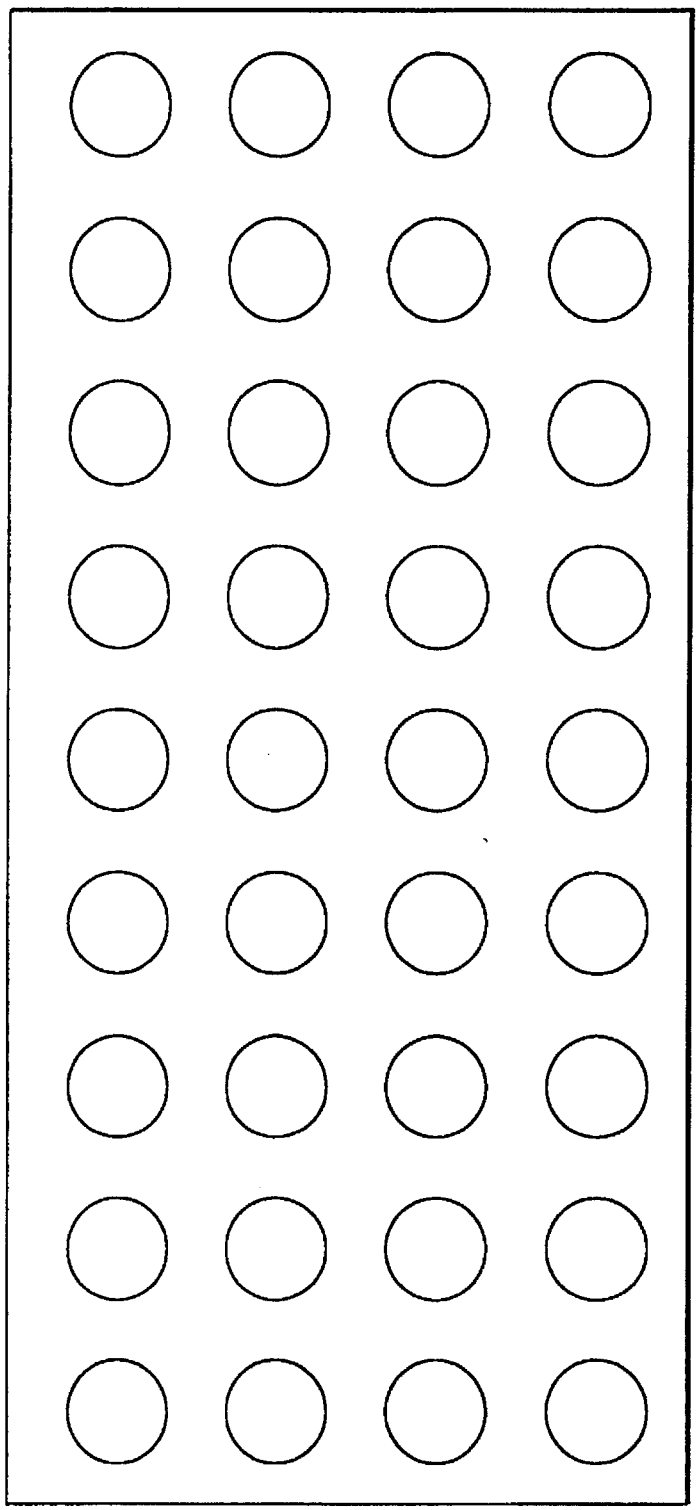

COMPOSITE MATERIAL

BACKGROUND OF THE INVENTION

The invention relates to a metal-plastic composite material that is stretch-formable and/or deep-drawable, the use of the composite material and containers made from the composite material.

It is known to use stretch-formed, aluminium shaped-packs made from composite materials for containment of pharmaceutical products and foodstuffs e.g. as push-through packs, containers, under-seal trays, double moulds and the like. These are able to satisfy fully the high demands made with respect to protection of the contents against diffusion of oxygen, steam and light, or preventing loss of fragrance, for example, and to improve the user-friendliness of the of the packaging.

Further requirements that arise are the suitability for sterilisation, pasteurisation or for hot-filling.

It is state-of-the-art to manufacture stretch-formed containers from composite or laminate materials featuring a central aluminium layer, an outer layer of oriented polyamide and an inner layer of polyvinyl chloride. Today, in order to protect the environment, the use of polyvinyl chloride should be limited. Polyvinyl-chloride-free layers or those low in polyvinyl chloride have the advantage of producing no or only little pollution if they are energy-recycled instead of material-recycled. On disposing of laminates of this type it is also advantageous if the number of different types of material present is as small as possible.

Composite materials for packaging purposes containing no polyvinyl chloride are known per se.

Described in EP-A-0 474 587 is a composite for containers that features barrier properties. The composite features a metal layer on both sides of which is a layer of polyolefin. This composite is not able to satisfy all the properties required today Described in DE-OS 27 57 370 is a laminate film for manufacturing deep-drawn shaped parts. The said laminate film, however, requires a specific aluminium foil.

U.S. Pat. Nos. 4,085,244 and 4,216,268 describe a laminated packaging film comprising an outer biaxially-oriented polyamide film, a flexible metal foil, a biaxially-oriented polypropylene film and an inner sealing layer for manufacturing pouches.

Because of its asymmetric make-up, viz., relatively thick inner polypropylene layer, this film is not very suitable as a stretch-form laminate. Also, because of the two classes of plastic present, this material is more difficult to recycle.

German patent document 34 36 412 describes a metal sheet which is laminated on one or both sides with a biaxially-oriented polyester film and is considered suitable for drawing cans. In order to ensure proper bonding between the metal and the polyester foil, the metal sheet must have a double layer of hydrated chromium oxide. A metal sheet of this type is complex to manufacture and chromium oxide layers are undesirable, for example in foodstuff packaging, or may be prohibited.

None of the composite materials, laminate films or laminates described above can be combined to give the optimum properties required for stretch-forming. This also applies to the properties required for protection of the environment which promote e.g. recyclability of the laminates or objects prepared therefrom, such as forms of packaging.

The packaging laminates known up to now exhibit the disadvantage of not being equally suitable at meeting all of the properties required by the packaging industry, such as flatness (rigidity) after shaping, ability to be deep-drawn or stretch-drawn, to withstand shock and/or long term cooling, vacuum conditions, long term storage and pasteurising and sterilising conditions.

A suitable composite material must assist elongation of the metal layer during the stretching process so that elongations per unit area of 80% and more can be achieved without damage occurring, such as perforation of the metal layer. Protecting the metal layer from perforation or tearing is very significant as the metal layer serves mainly as a barrier layer against inward diffusion of gases such as oxygen, penetration of steam and light, and against the outward diffusion of fragrance and aromas.

After the deep-drawing or stretch-drawing operation the composite material must capable of undergoing a shock-freezing and/or freeze-drying process without delamination and change of shape.

SUMMARY OF THE INVENTION

The object of the present invention is to provide a metal-plastic composite material which can be deep-drawn and/or stretch-drawn, and has the required properties but does not exhibit the above mentioned disadvantages.

That objective is achieved by way of the invention in the form of a deep-drawable and/or stretch-drawable composite material having a metal layer with a plastic layer on each side, the metal layer having a thickness of 8 to 80 μm and the plastic layers each a thickness of 20 to 50 μm, the plastic layers containing or comprising polyamide based thermoplastics.

BRIEF DESCRIPTION OF THE DRAWING

The drawing shows a front view of the blister pack of the present invention.

DETAILED DESCRIPTION OF PREFERRED EMBODIMENTS

The metal layer of the composite may, for example, be of iron, steel or copper, preferably however of aluminium or an aluminium alloy. Useful is a metal layer of aluminium of 98.6% purity and higher, preferably 99.2% and higher and especially preferred of 99.5% and higher. Also useful are aluminium alloys e.g. of the types AA 8014, AA 8079, or AA 8101.

Preferred are foils of aluminium or an aluminium alloy. The foils exhibit e.g. an elongation at failure of less than 30%, in particular less than 10%, in each case at a strain rate of less than $10^1$ %/sec (DIN 53 455).

Especially preferred as metal layer is a soft-annealed, fine-grained and/or texture-free (isotropic) aluminium thin strip, in particular such having 5 and, especially preferred, 7 layers of grains across the thickness of the strip.

The surface of the metal layer, and in particular that of the aluminium layer is advantageously homogeneous, free of residual lubricant and defined. The aluminium surfaces may for example be treated by deposition of epoxy or phenolic-based stored coatings, or with coatings such as mixed oxides and/or hydrated layers. Further, the surfaces may be pre-treated by means of a corona discharge treatment.

The plastic layers contain a polyamide-based thermoplastic or may be comprised mainly of polyamide-based thermoplastics.

Belonging to the polyamide-based thermoplastics are, for example, the polyamides polyamide 6, a homopolymer of ε-caprolactam (polycaprolactam); polyamide 11, polyamide 12, a homopolymer of ω-laurinlactam (polylaurinlactam); polyamide 6.6, a homo-poly-condensate of hexa-methylene-adiamine and adipinic acid (poly-hexa-methylene-adipamide); polyamide 6.10, a homo-poly-condensate of hexa-methylene-diamine and sebacinic acid (poly-hexa-methylene-sebacamide); polyamide 6.12, a homo-poly-condensate of hexamethylene-diamine and dodecandic acid (poly-hexamethylene-dodecanamide) or polyamide 6-3-T, a homo-poly-condensate of trimethyl-hexamethylene-diamine and terephthalic acid (poly-trimethyl-hexa-methylene-terephthalamide), and mixtures therefrom. Preferred are polycaprolactams.

The plastic layers may include e.g. monofilms or monolayers and composites of two or more films or layers of plastics such as polyamides, polyamide mixtures or mixed, block, grafted or copolyamides.

The plastic films as such may be present as monofilms, however also as composites of two or more films.

The polyamides and the plastic layers or plastic films thereof may contain additives such as e.g. stabilisers, softeners, filler materials, pigments etc.

The plastic layers may be stretched and are usefully uniaxially, preferably biaxially stretched. The plastic layers, in particular the plastic films may contain or be stretched polyamide-based thermoplastics. Very strongly preferred are uniaxially or in particular biaxially stretched polyamides, especially polyamide films.

The flow behaviour of the plastic layer in the form of films and in particular in the form of biaxially stretched polyamide films is usefully as isotropic as possible.

Furthermore, the plastic films that are preferred are those with a flow behaviour that results in a high degree of strain hardening.

The high degree of strain hardening is evidence of increasing stress in the film in the longitudinal and transverse directions with increasing elongation.

Likewise preferred is a flow behaviour whereby the foil exhibits positive strain hardening at least in the longitudinal or transverse direction. The positive strain hardening is expressed as the ratio of the increment in stress to the increment in strain and lies therefore preferably above a value of 0 i.e. the value is preferably positive.

Particularly suitable plastic films exhibit a high R-value, especially a value greater than 1. The R-value indicates whether the material flows preferably from the width or from the thickness of the film in question. An R-value greater than 1 indicates that the material flows preferably from the width of the sample.

Among the preferred films are for example biaxially stretched polyamide films having a tensile strength in both directions of greater than 150 MPa, preferably greater than 200 MPa.

The elongation at fracture of preferred films lies e.g. above 40% and especially greater than 50%.

Preferred films are usefully under a stress of 40 to 120 MPa, in particular 50 to 100 MPa in the elongation range 5–15%.

The thickness of the metal layer may be preferably 40 to 70 μm, and in particular 45 to 60 μm.

The thickness of each plastic layer is preferably 20 to 50 μm, in particular 20 to 30 μm.

The plastic layers on both sides of the metal layer of the composite according to the invention may, for example, have the same thickness or may differ in thickness preferably not more than 20%, in particular not more than 10% i.e. the plastic layers differ in thickness preferably by 0 to 20%, or 0 to 10% resp.

The plastic layers on both sides of the metal layer, in particular the polyamide-based thermoplastics may additionally, and independent of each other, be provided with an outer lying sealable layer and/or a barrier layer of thermoplastics.

The composite according to the invention may also feature a sealing layer or sealable layer on one or both sides.

The composite material according to the present invention forms a composite containing plastic films that, in order to extend the range of properties, may be coated with one or more layers of material such as e.g. plastic films.

Sealable layers are e.g. sealable films deposited e.g. via adhesives that contain or are free of solvents, or water-based adhesive systems, applied by extrusion lamination or lamination coating. Sealable films may contain or consist of e.g. LLDPE, LDPE, MDPE, HDPE, polypropylene, polyethylene-terephthalate or polyolefin-based ionomers. Ionomers or ionomer-containing polymers with typical properties of ionomers may be thermoplastic copolymers of olefin with carboxyl-containing monomers, a part of which are present as free carboxyl groups and the remainder bonded to metal cations so that some transverse cross-linking is achieved. Polyethylene-based ionomers are known under the trade name Surlyn. Sealable films may be 6–100 μm thick. Furthermore, one or more layers e.g. 1 to 10 μm thick, of a sealing coating or hot-sealing coating for example, may be deposited on the plastic film composite.

A single or double-sided sealable composite is obtained by single or double-sided coextrusion of the plastic layers with e.g. a polypropylene/polyethylene copolymer.

In that connection it is useful for the plastic layers to contain or comprise of a polyamide-based thermoplastic and at least one a polyamide-based thermoplastic to feature a sealing layer on at least one side i.e. each layer of polyamide-based thermoplastic may be covered with a sealable layer on one or both sides, independent of the other layers.

Besides the metal foil, at least one additional layer may be provided as a barrier layer against gases, steam, moisture, substances imparting aromas and flavours. Examples of barrier layers are thermoplastic films with barrier properties comprising or containing copolymers of ethylene-vinyl-alcohol, polyvinylidenchloride, polyacrylnitrile, e.g. BAREX, polyacryl-polyamide copolymers barrier layer-copolyester, e.g. Mitsui B-010, aromatic and amorphous polyamides, e.g. N-MXD6 from Mitsubishi Gas Chemical, and may be e.g. 6 to 100 μm thick. Preferred is a polyvinyliden barrier layer. Barrier layers are situated for example between the metal layer and the polyamide layer or layers; the barrier layers are preferably situated on the polyamide layer on the opposite side facing the metal layer. Foreseen in particular is a barrier layer on one side of the metal layer only, lying on the polyamide layer.

The surface of the plastic film should usefully exhibit a surface tension of at least 35 mN/m, preferably at least 38 mN/m in order that the adhesive can be deposited in an optimal manner on the surface of the plastic.

The surface tension, and with that also the adhesive properties, can be controlled by means of corona, plasma or flame treatment of the surfaces of the plastic films and/or the metal e.g. aluminium surfaces.

To join the plastic films to the aluminium foil or to bond the plastic films to each other, an adhesive coating and/or a bonding primer are usefully employed. The adhesive coating may be applied by coating of the surface to be bonded.

Suitable adhesives are, for example, vinyl chloride copolymers, vinyl chloride-vinyl acetate copolymers, polymerisable polyesters, vinyl pyridine-polymers, vinyl-pyridine-polymers combined with epoxy resins, butadien-acrylnitril-methacrylic acid copolymers, phenolic resins, caoutchouc derivatives, acrylic resins, acrylic resins with phenolic or epoxy resins, silicon-organic compounds, such as organosilane, modified polyolefins, such as acid modified polyolefins or ethylene acrylic acid (EAA).

Preferred are EAA (ethylene acrylic acid) or modified polyolefins such as e.g. modified polypropylenes.

A preferred modified polypropylene is an adduct of maleic-acid-anhydride and an ethylene-propylene copolymer. Very strongly preferred are dispersions of modified polyolefins, one example of which is Morprime (trade name of the company Morton Chemical Division of Norton Norwich Products Inc.).

Also suitable are bonding agents such as nitrile-caoutchouc phenolic-resins, epoxides, acrylnitril-butadiene-caoutchouc, urethane-modified acryls, polyester-co-polyamides, hot-melt polyesters, polyisocyantes cross-linked with hot-melt polyester, polyisobutylene-modified styrol-butadien-caoutchoucs, urethanes, polyurethanes, ethylene-acrylic acid mixed polymers and ethylene-vinyl acetate mixed polymers.

If adhesive coatings are employed, then they may contain or be free of solvents and may contain water. Examples thereof are solvent-containing, solvent-free or aqueous acrylate or polyurethane adhesives.

Preferred are adhesive coatings that are polyurethane-based.

The bonding agent or primer may for example be applied in amounts of 0.1 to 10 $g/m^2$, usefully 0.8 to 6 $g/m^2$ and preferably 2 to 6 $g/m^2$.

As a rule the adhesive is applied with a thickness of 1 to 12 μm, preferably 1.5 to 9 μm. Instead of layer thickness the amount of adhesive applied can be expressed quantitatively, especially the amount applied between the metal layer and the plastic layers situated directly next to both sides of the metal layer. For example, the amount applied is 0.1 to 14 $g/m^2$, usefully 1.5 to 9 $g/m^2$ and preferably 2 to 6 $g/m^2$. The amount does not include any solvent. The plastic films may also be warm-coated to each other or to the metal surface such as that of aluminium.

Typical arrangements of the layers in composites according to the invention include for example:

a) a middle layer of aluminium of thickness e.g. 8 to 80 μm, preferably 40 to 70 μm and in particular 45 to 60 μm, and on each side of the aluminium layer b) and b') a layer of adhesive coating and/or bonding agent having a thickness of 1.5 to 9 μm, or 1 to 10 $g/m^2$ c) and c') a layer of a biaxially stretched polyamide of thickness e.g. 20 to 50 μm, preferably 20 to 40 μm and in particular 20 to 30 μm and if desired d) and d') a barrier layer on one or both sides and if desired e) and/or e') a layer of a sealing coating or sealing layer on one or both sides in a quantity of 2 to 6 $g/m^2$, or of thickness up to 10 μm.

Layers b) and b') of coating adhesive and/or bonding agent may also be employed between the layers c) and d), c) and e) and/or d) and e), and between c') and d'), c') and e') and/or d') and e').

Useful composite materials contain e.g. layer a), layers b) and b'), layers c) and c') and a layer e) or contain the layer a), layers b) and b'), layers c) and c') and layer e'). Other useful composite materials contain e.g. the layer a), layers b) and b'), layers c) and c'), possibly a further layer b') with a layer d') on top of it, and possibly on layer c) and/or d') one layer each of e) or e'). A layer b) and b') may also be provided between layer c) and e) and between d') and e') resp. Analogously, layers b), c), d) and e) are provided on one side of layer a) and layers b'), c'), d') and e') on the other side of layer a).

Packaging or parts of packaging manufactured out of the composite materials according to the invention must e.g. be resistant to heat and cold, and also be able to withstand these conditions under vacuum. The individual components of the composite materials are therefore usefully resistant to heat and cold both individually and when combined as a composite. These properties apply in particular for the individual plastic films, any extrudates, coextrudates or laminates and to the adhesives and bonding agents employed.

The invention relates also to the use of the stretch-drawable composite material according to the invention for production of deep-drawn and/or stretch-drawn, and in particular stretch-drawn containers e.g. base parts, blister packs, blister pack base parts or containers or base parts having a plurality of compartments, recesses or cups. The invention relates especially to the use of the composite material according to the invention for production of cold-deep-drawn and/or cold-stretch-drawn and in particular stretch-drawn containers.

The deep-drawn and/or stretch-drawn composites according to the invention are suitable, for example, for manufacturing deep-drawn and/or stretch-drawn containers having a height to diameter ratio of e.g. 1:4 and usefully 1:3.7 to 3.2, especially in the case of flat bottomed containers.

To be understood by the diameter of containers that do not have a round plan view is the length of the diagonals or the average lengths of the diagonals.

The processes employed for drawing, such as deep-drawing or stretch-drawing or combinations thereof, to manufacture containers from the deep-drawable and/or stretch-drawable composite materials according to the invention are generally known. As a rule a piece of the composite material is laid over a die. The composite material is held in place at the edge of the die with the aid of a holding plate, and a male part of the die is lowered into the recess, at the same time stretching the composite. The composite materials according to the invention are particularly suitable for stretch-drawing. The composite materials according to the invention are particularly suitable for cold drawing and cold stretch-drawing.

The material cannot flow from the edge region during stretch-drawing, therefore it is stretched. As a result the thickness of the material is reduced.

The described composite laminate according to the invention exhibits optimal stretch-drawing tendency and controlled mechanical properties that promote the elongation of the aluminium layer during the stretch-drawing process, so that elongations per unit area of 80% and more can be achieved without damaging the metal layer.

Under uniaxial tensile conditions the aluminium layer can be elongated without damage up to 40% and more.

The present invention also includes containers made from the stretch-drawable composite according to the invention, usefully having a height to diameter ratio of 1:4 and preferably from 1:3.7 to 1:3.2, in particular in the case of flat bottomed containers.

The containers that are manufactured out of the stretch-drawable composite material according to the invention are suitable for example for storing foodstuffs for humans or animals. Other applications are e.g. containers for pharmaceutical products such as coated tablets, tablets, powders etc., and cosmetic products such as perfumed serviettes, colorants etc.

The present composite material according to the invention is particularly suitable for stretch-drawing as a means of forming packaging for tablets. Such packaging forms are shown generally in the drawing and may feature a base having at least one and in particular a plurality of, for example 5 to 50, individual compartments, recesses or cups into which a tablet, or some other form of supplying an active ingredient, can be laid, so that a lidding material may be deposited and the base permanently attached to the lid. Such forms of tablet packaging are known in the field as blister packs. The base parts, made from a composite material according to the invention are produced e.g. by preparing the composite material in the form of rolls or sheets and feeding the composite to a stretch-drawing device where a drawing process followed by filling, closing etc. is carded out. It is also possible to employ the composite material according to the invention for base parts of packaging forms for pharmaceutical products where the pharmaceutical product is introduced into the base part of the packaging featuring recesses in liquid form, frozen or shock-frozen and subjected to a freeze drying process and the base part finally joined to a lid, the freeze-dried pharmaceutical product remaining in each of the recesses in the base part.

For example, a pharmaceutical active ingredient may be dissolved in a water-soluble matrix which may be a mixture of saccharide and polymer; other agents such as suspension agents, wetting agents, stabilisers, antioxidants, colorants and flavouring agents may also be present. A stable aqueous suspension is produced from these materials and prepared for filling into the recesses in the base part. Each recess in the base part is then filled with a predetermined amount of the suspension and the base part frozen along with the contents. The base parts are introduced into a freeze-drying device and exposed to the freeze-drying conditions. After freeze drying to a given degree, the base parts are covered by a lidding material which is then permanently sealed to the base parts around each compartment. This process is described e.g. in the "Manufacturing Chemist", February 1990, pp 36 and 37.

Accordingly, the present invention is also related to the use of the deep-drawable and/or stretch-drawable composite material according to the invention for the manufacture of deep-drawn and/or stretch-drawn containers having a plurality of compartments, recesses or cups (blister packs) for use in freeze-drying processes for pharmaceutical products.

Furthermore, the present invention relates to containers having a plurality of compartments, recesses or cups (blister packs) for use in freeze-drying processes for pharmaceutical products where said containers are made from deep-drawn and/or stretch drawn composite materials according to the present invention.

Suitable lid material for manufacturing the lids may for example be a metal foil such as aluminium foil, e.g. of thickness 15 to 25 µm having on one side a 20 to 25 µm thick film of polyethylene-terephthalate and on the other side a hot-sealing layer with which the lid is permanently bonded to the base part. Another lid material may for example exhibit the following layers from outside to inside: sulphate paper having a weight of 40 to 60 g/m$^2$, a 10 to 15 µm thick film of polyethylene-terephthalate, a 15 to 25 µm thick aluminium foil and a sealing layer of 6 to 8 g/m$^2$.

EXAMPLE NO. 1

A polyethylene adhesive coating is deposited in an amount of 4 g/m$^2$ onto a 45 µm thick strip of aluminium that has a clean surface without pretreatment.

The solvent in the adhesive coating is evaporated off in a drying tunnel. Following this, a 25 µm thick biaxially stretched film of polyamide is laminated onto the aluminium strip under pressure in the lamination gap, and the composite coiled or processed further immediately.

The further processing takes place as described above, only the other side of the aluminium strip is laminated under the same conditions with a 25 µm thick polyamide film.

One of the polyamide films of the composite is coated on the outside with 1.5 g/m$^2$ of hot sealing layer containing polyvinylidenchloride.

EXAMPLE NO. 2

A composite as described in example No. 1 is coated with a 4 g/m$^2$ hot-sealing layer instead of the polyvinylidenchloride-containing sealing layer.

EXAMPLE NO. 3

The trial described in example No. 1 was repeated, however, using a 60 µm thick aluminium foil instead of the 45 µm thick aluminium foil.

EXAMPLE NO. 4

The trial described in example No. 2 was repeated, however, using a 60 µm thick aluminium foil instead of the 45 µm thick aluminium foil.

EXAMPLE NO. 5

A composite material of the following laminar structure was made using a 25 µm thick aluminium strip of 98.5% metal purity and 25 µm thick polyamide film: a 25 µm thick polyamide film, 3.5 g/m$^2$ adhesive, 2.0 g/m$^2$ primer or bonding agent, a 45 µm thick aluminium foil, a 4 g/m$^2$ layer of adhesive and a 25 µm thick polyamide film. The result was a composite with weight per unit area of 188.5 g/m$^2$.

EXAMPLE NO. 6

A composite material was produced with the following laminate structure: 25 µm thick polyamide film, 3.5 g/m$^2$ adhesive, 2.0 g/m$^2$ bonding agent or primer, a 60 µm thick aluminium foil, 4.0 g/m$^2$ adhesive and a 25 µm thick polyamide film. The weight per unit area amounted to 229 g/m$^2$.

EXAMPLE NO. 7

Using samples of the materials described in examples 1 to 6 it is possible to achieve a depth before fracture of more than 9 mm on stretch-drawing the said samples with a 27 mm diameter male die and 30 mm diameter female die.

By stretch-drawing over a hemispherical sphere of radius 13.5 mm and female die of 30 mm it is possible to achieve a depth at fracture of more than 13 mm with the samples described in examples 1 to 6.

At temperatures of 140° C. and higher it is possible to carry out satisfactory thermal sealing with samples from examples 1 to 6.

Sterilisation at a temperature of 120° C. for 30 min after shaping and storage for three months at 45° C. lead to no delamination of the layers in the samples described in examples 1 to 6.

Exposure to cold conditions of −80° C. for 3 minutes or −40° C. for 2 h at negative pressure followed by storage for three months at 45° C. leads to no delamination of the layers in the samples described in examples 1 to 6.

Exposure to cold conditions of −80° C. for 3 minutes or −40° C. for 2 h at negative pressure, and the surface of the sample covered by an aqueous suspension, leads to no delamination in the samples described in examples 1 to 6.

We claim:

1. A blister pack base part for use in freeze drying applications for foodstuffs and pharmaceuticals, comprising:
a composite material forming said base, wherein said composite material includes a metal layer with two sides and a plastic layer on each of said two sides, said metal layer having a thickness of 8 to 80 μm and said plastic layer on each of said sides having a thickness of 20 to 50 μm and containing polyamide-based thermoplastics; and
a plurality of compartments formed in said composite material for receiving at least one of said pharmaceuticals and foodstuffs.

2. The blister pack base part according to claim 1, wherein each of said sides of said metal layer has only one plastic layer with polyamide based thermoplastics adjacent thereto.

3. The blister pack base part according to claim 1, wherein the polyamide-based thermoplastics are at least one of a polycaprolactam and a copolymer of a polycaprolactam.

4. The blister pack base part according to claim 1, wherein said plastic layers are biaxially stretched polyamide films.

5. The blister pack base part according to claim 1, wherein at least one plastic layer including said polyamide-based thermoplastic further includes an outer sealing layer.

6. The composite material according to claim 1, wherein said metal layer is one of a foil and thin strip formed from one of aluminum and aluminum alloy.

7. The composite material according to claim 1, wherein said metal layer has a thickness ranging from 40 to 70 μm.

8. The composite material according to claim 1, wherein each plastic layer has a thickness in the range of 20 to 30 μm.

9. The composite material according to claim 1, wherein said plastic layer on one side of said composite differs in thickness from said plastic layer on another side of said composite by 0 to 20% of the thickness of said plastic layer.

* * * * *